(Model.)

J. P. FULGHAM.
Feeding Mechanism for Seeding Machines.

No. 239,760.          Patented April 5, 1881.

Witnesses:
W. H. H. Knight
W. Blackstock

Inventor:
Jesse P. Fulgham
by Hill & Church
His Attorneys

UNITED STATES PATENT OFFICE.

JESSE P. FULGHAM, OF RICHMOND, INDIANA, ASSIGNOR OF ONE-HALF TO WAYNE AGRICULTURAL COMPANY, OF SAME PLACE.

FEEDING MECHANISM FOR SEEDING-MACHINES.

SPECIFICATION forming part of Letters Patent No. 239,760, dated April 5, 1881.

Application filed February 8, 1881. (Model.)

*To all whom it may concern:*

Be it known that I, JESSE P. FULGHAM, of Richmond, in the county of Wayne and State of Indiana, have invented certain new and useful Improvements in the Feeding Mechanism for Seeding-Machines; and I do hereby declare the following to be a full, clear, and exact description of the same, which will enable others skilled in the art to which my invention appertains to make and use it, reference being had to the accompanying drawings, forming part of this specification, wherein—

Figure 1:
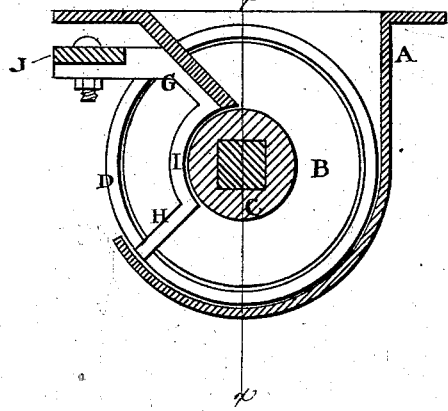
Figure 1:
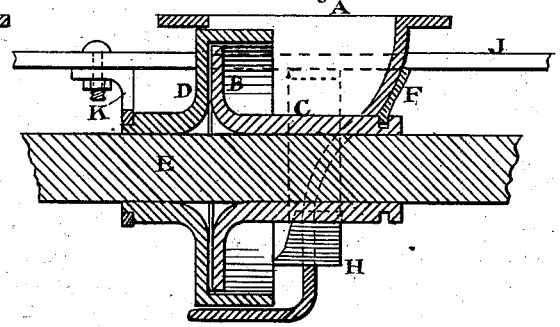
Figure 1:
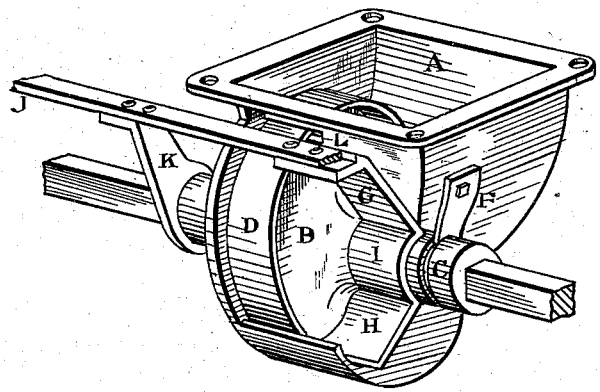

Figure 1 is a perspective view of a seed-cup and the feeding devices connected therewith. Fig. 2 is a vertical section of the same in the plane of the feed-wheel; and Fig. 3 is a vertical section in the plane of the line $x$ $x$, Fig. 2.

Similar letters of reference denote like parts in the several figures of the drawings.

My invention relates to that class of feeding mechanism for seeding-machines in which the seed-cups that receive the grain from the hopper each contain a vertical gage or cut-off disk and a vertical wheel having a lateral edge flange to fit over the disk and force the grain out of the cup through an elevated discharge-orifice.

To regulate the quantity of grain to be discharged from the seed-cups, the cut-off disks are adjusted to and fro within the flanged feed-wheels for increasing or decreasing the depth of the flange exposed to the grain within the cups, and suitable gage-plates or wings are provided to prevent the grain from falling out of the cups over the front of the feed-wheels, and to adjust the grain-channel without decreasing the capacity of the seed-cups. This method of construction and adjustment is defective, because in moving the disk, when the machine is not in motion, for the purpose of adjusting the discharge of the grain its entire outer side is forced against the grain and cramps and crushes it in the seed-cup.

My invention is designed to obviate or avoid this defect; and to this end it consists in adapting the feed-wheel for adjustment instead of the gage-disk, in order to present only the thin edge of the feeding-flange to the grain in the seed-cup, so that the adjustment of its feeding capacity can be effected when the machine is not in operation without cramping or crushing the grain in the seed-cup.

It also consists in the provision of means for the lateral movement and control of the sliding feed-wheel.

In the accompanying drawings, A represents a seed-cup of the usual or any preferred pattern adapted for use with this class of feeds.

B is the gage or cut-off disk, placed vertically within the seed-cup near one side, and formed with a central hub on one face, which passes across the cup and projects through its opposite side. The disk thus forms a rotary wall for one side of the cup.

D is the flanged feed-wheel, placed vertically in the seed-cup to work through the side thereof, with its flange surrounding the edge of the gage-disk. The feed-wheel is provided with an outwardly-projecting hub, which, together with the hub of the gage-disk, receives the squared driving-shaft E, adapted for rotation from the axle of the machine by any suitable means. Both the feed-wheel and disk rotate with the shaft, the former being also arranged to slide on it; but the latter is prevented from longitudinal movement while rotating with the shaft by any suitable means, such, for example, as a forked button, F, secured to the outside of the seed-cup, with its forked end entering a groove in the projecting end of the hub C.

G is the upper and H the lower guard-plates, cast at an angle to each other on a segmental center, I, which fits against the front of the disk-hub C, so that the guard-plates shall close the seed-cup in front of the hub. The upper plate prevents the grain from falling out of the seed-cup in front of the feed-wheel, and the lower one serves to gage the grain-channel in proportion to the quantity of grain discharged without diminishing the capacity of the cup. These plates bear against the flange of the feed-wheel at the top and bottom, and serve to slide the wheel off the gage-disk when the feed is to be decreased; and, inasmuch as they are not held in place by the cup, the whole series belonging to a complete seeding-machine is attached to an actuating-bar, J, which is guided on the machine in such a manner that it can slide longitudinally to move all the plates of the series, and at the same time be kept in its track. The feed-wheels are also connected to the actuating-bar by means of brackets K, which fit over or bear against the ends of the hubs. Thus the feed-wheels of all the cups are placed between two sets of brackets operated by the actuating-bar, one set bearing against the hubs of the wheels to slide them onto the disks for increasing the feed, and the other set bearing against the flanges of the wheels to slide the latter off the disks for decreasing the feed, this latter set also accompanying the movements of the wheels to form the requisite guards, as above set forth.

L is a slot or recess formed in the front of the seed-cup to receive the flange of the feed-wheel and permit its adjustment in the cup.

When the seeding-machine is in operation the grain from the hopper passes into the seed-cup and falls behind the hub of the gage-disk onto the flange of the feed-wheel at the bottom, between the side of the cup and the gage-disk, from whence it is fed forward and upward to the discharge-orifice by the wheels and disks in the usual manner.

By adapting the feed-wheels for adjustment as above described the thin edges of their flanges only are forced through the grain when they are moved into the cup, and therefore prevent the seed from being crushed or broken.

Having thus described my invention, what I claim is—

1. In a feed for seeding-machines, the combination, with a seed-cup, of a rotating non-sliding gage-disk and a rotating and sliding flanged feed-wheel, substantially as described, for the purpose specified.

2. In a feed for seeding-machines, the combination, with the seed-cup, of a vertical cut-off disk provided with a hub extending across the cup and projecting through the side, so as to rotate but not slide thereon, substantially as described, for the purpose specified.

3. In a feed for seeding-machines, the combination of the seed-cup with a rotary non-sliding cut-off disk supported in the cup by a long hub having its bearings in one side of said cup, said disk forming a rotating wall for the opposite side of the cup, substantially as described, for the purpose specified.

4. In a feed for seeding-machines, the combination, with the seed-cup, of a vertical flanged feed-wheel and a vertical cut-off disk, the flange of the wheel being arranged to traverse the side of the cup surrounding the edge of the disk, substantially as described, for the purpose specified.

5. The combination of the bracket and guard plates G H with the seed-cup, flanged feed-wheel, and cut-off disk, substantially as described, for the purpose specified.

6. The combination of the bracket and guard plates G H with the flanged feed-wheel and actuating-bar, substantially as described, for the purpose specified.

7. The combination of the actuating-bar and flanged feed-wheel with the brackets G, H, and K, substantially as described.

8. The combination of the non-sliding shaft, the flanged feed-wheel sliding on said shaft, and the seed-cup with an actuating-bar provided with brackets to move the wheel in opposite directions within the cup, substantially as described.

The foregoing specification of my invention signed by me this 21st day of January, A. D. 1881.

JESSE P. FULGHAM.

Witnesses:
PHILIP S. GOODWIN,
E. A. ELLSWORTH.